(12) United States Patent
Vild et al.

(10) Patent No.: US 9,481,918 B2
(45) Date of Patent: Nov. 1, 2016

(54) IMPACT RESISTANT SCRAP SUBMERGENCE DEVICE

(71) Applicants: Chris T. Vild, Solon, OH (US); Robert L. Grodeck, Cleveland, OH (US)

(72) Inventors: Chris T. Vild, Solon, OH (US); Robert L. Grodeck, Cleveland, OH (US)

(73) Assignee: PYROTEK, INC., Spokane, WA (US)

( * ) Notice: Subject to any disclaimer, the term of this patent is extended or adjusted under 35 U.S.C. 154(b) by 256 days.

(21) Appl. No.: 14/258,348

(22) Filed: Apr. 22, 2014

(65) Prior Publication Data

US 2015/0102536 A1    Apr. 16, 2015

Related U.S. Application Data

(60) Provisional application No. 61/890,931, filed on Oct. 15, 2013.

(51) Int. Cl.

| F27D 3/14 | (2006.01) |
|---|---|
| C22B 21/00 | (2006.01) |
| C22B 7/00 | (2006.01) |
| F27B 3/18 | (2006.01) |
| F27B 3/19 | (2006.01) |
| F27B 3/16 | (2006.01) |
| F27B 3/04 | (2006.01) |
| F27D 27/00 | (2010.01) |

(52) U.S. Cl.
CPC ......... *C22B 21/0092* (2013.01); *C22B 7/003* (2013.01); *F27B 3/045* (2013.01); *F27B 3/16* (2013.01); *F27B 3/18* (2013.01); *F27B 3/19* (2013.01); *F27D 3/14* (2013.01); *F27D 27/005* (2013.01); *Y02P 10/218* (2015.11)

(58) Field of Classification Search
CPC .................................. F27B 3/045; F27B 3/18
USPC .................................................. 266/200, 903
See application file for complete search history.

(56) References Cited

U.S. PATENT DOCUMENTS

| 4,491,474 A | 1/1985 | Ormesher |
| 4,930,986 A | 6/1990 | Cooper |
| 6,217,823 B1 | 4/2001 | Vild et al. |
| 2005/0017417 A1 | 1/2005 | Grayson et al. |
| 2008/0006973 A1 | 1/2008 | Vild et al. |
| 2011/0133374 A1* | 6/2011 | Cooper .................. C22B 7/003 266/200 |
| 2014/0232048 A1* | 8/2014 | Howitt .................... C22B 7/003 266/233 |
| 2015/0102536 A1* | 4/2015 | Vild ..................... C22B 21/0092 266/44 |

* cited by examiner

*Primary Examiner* — Scott Kastler
(74) *Attorney, Agent, or Firm* — Fay Sharpe LLP

(57) ABSTRACT

A metal scrap submergence device having an open top chamber including side and base walls of a heat resistant material. An inlet is included in a side or base wall of the chamber for receiving molten metal. An outlet is included in the base of the chamber. A ramp extends from the side wall of the chamber to an inner column defining the outlet. The ramp includes a first edge adjacent the side wall and second interior edge adjacent the inner column. The working surface of the ramp between the first and second edges is concave. The inner column includes an end wall disposed opposite the chamber base, the end wall includes rounded inner and outer edges.

19 Claims, 4 Drawing Sheets

IMPACT RESISTANT SCRAP SUBMERGENCE DEVICE

This application claims the benefit of U.S. Provisional Application 61/890,931 filed Oct. 15, 2013, the disclosure of which is herein incorporated by reference.

BACKGROUND

The present invention is directed to a scrap submergence system of the type typically employed in metal recycling processes, particularly, the recycling of aluminum. The present exemplary embodiment relates to an impact resistant scrap submergence device having an improved flow rate.

In the recycling of metals, it is necessary to melt scrap pieces for treatment and processing. A large portion of the aluminum scrap pieces are thin walled as a result of the mechanical shaping action from which they are formed, such as, shaving, boring and cold rolling. Melting thin walled scrap pieces is particularly difficult because (i) extended exposure to the hostile atmosphere in a traditional melting furnace results in extremely high oxidation loss and, (ii) rapid submerging in molten metal is severely hampered by the fact that thin walled scrap pieces float on molten metal ("floating scrap").

In a typical melting operation used to convert floating scrap to ingot, a melting furnace is provided with an enclosed hearth and a connected open sidewell. Usually the sidewell is divided into a pump well and a melting bay. A pump or other molten metal flow inducing apparatus is positioned externally to the melting bay (e.g., in the pump well), and causes molten metal to flow from the hearth to the melting bay. Typically the melting bay is further divided into a chargewell and a drosswell. Metal scrap pieces are fed into the melting bay, particularly the chargewell portion thereof.

A variety of apparatus have been used in the melting bay (specifically in the chargewell) to facilitate the submergence of the scrap metal below the surface of the molten metal bath. Three major types of systems exist. The first type includes mechanical systems constructed primarily of a rotor which creates a molten metal flow from the top surface. Examples of these devices are shown in U.S. Pat. Nos. 3,873,305; 3,997,336; 4,128,415; and 4,930,986. The second type of system uses a mechanical device to physically push the scrap below the melt surface (e.g., elephant feet/ well-walkers). The third type of system relies on the shape of the chamber without rotation of a rotor to create a metal flow which submerges scrap pieces in the chargewell. Particularly, the flow of molten metal into the chargewell is manipulated in such a manner to achieve a vortex which draws chips from the top surface into the bath. These systems include, for example, U.S. Pat. Nos. 3,955,970; 3,984,234; 4,286,985; 6,036,745; and 6,217,823, each of which is herein incorporated by reference. The present invention is directed to this third type of scrap submergence system.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a scrap submergence device having an open top chamber including walls constructed of a heat resistant material is provided. The chamber includes an inlet positioned in a side or base wall and an outlet positioned in its base. Generally, the chamber can be described as a bottom inlet, bottom outlet arrangement. A ramp is formed adjacent the wall(s) of the chamber, spiraling upwardly thereon. The ramp includes a first edge adjacent the wall and a second edge adjacent an internal column. The ramp has a concave surface between the first and second edges.

According to a second embodiment, a scrap submergence device having an open top chamber including walls constructed of a heat resistant material is provided. The chamber includes an inlet positioned in a side wall and an outlet positioned in its base. Generally, the chamber can be described as a bottom inlet, bottom outlet arrangement. A ramp is formed adjacent the side wall of the chamber, spiraling upwardly thereon. The ramp extends from the side wall to an inner column defining the outlet. The inner column includes an end wall disposed opposite the chamber base. The end wall includes at least one rounded edge.

According to a third embodiment, a metal scrap submergence device comprising an open top chamber including side and base walls of a heat resistant material is provided. An inlet is included in a side or base wall of the chamber for receiving molten metal. An outlet is included in the base of the chamber. A ramp extends from the side wall of the chamber to an inner column defining the outlet. The ramp includes a first edge adjacent the side wall and a second interior edge adjacent the inner column. The working surface of the ramp between the first and second edges is concave. The inner column includes an end wall disposed opposite the chamber base. The end wall includes rounded inner and outer edges.

According to a further embodiment, the present disclosure is directed to a method of recycling metal, particularly aluminum, employing the device described in the preceding paragraphs.

BRIEF DESCRIPTION OF THE DRAWINGS

The invention consists in the novel parts, construction, arrangements, combinations and improvements, shown and described. The accompanying drawings, which are incorporated in and constitute a part of the specification illustrate one embodiment of the invention and together with the description, serve to explain the principles of the invention.

DETAILED DESCRIPTION

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined by the appended claims.

The present invention is directed to a scrap submergence system of the type typically employed in metal recycling processes, such as, the recycling of aluminum. In the recycling of metals, it is necessary to melt scrap pieces for treatment and processing. A large portion of aluminum scrap pieces are thin walled as a result of the mechanical shaping action from which they are formed, such as, shaving, boring and cold rolling. Melting thin walled scrap pieces is particularly difficult because rapid submerging in molten metal is severely hampered by the fact that thin walled scrap pieces float on molten metal. Problematically, extended exposure to the hostile atmosphere in a traditional melting furnace results in extremely high oxidation loss In a typical melting operation used to convert lightweight scrap to ingot, a melting furnace is provided with an enclosed hearth and a connected open sidewell. Usually the sidewell is divided into a pump well and a melting bay. A pump or other molten metal flow inducing apparatus is positioned externally to the melting bay (e.g., in the pump well), and causes molten metal to flow from the hearth to the melting bay. Typically the melting bay is further divided into a charge well and a drosswell. Metal scrap pieces are fed into the melting bay, particularly the charge well component thereof. Floating dross is skimmed from the surface of the molten metal in the dross well.

Figure 1:
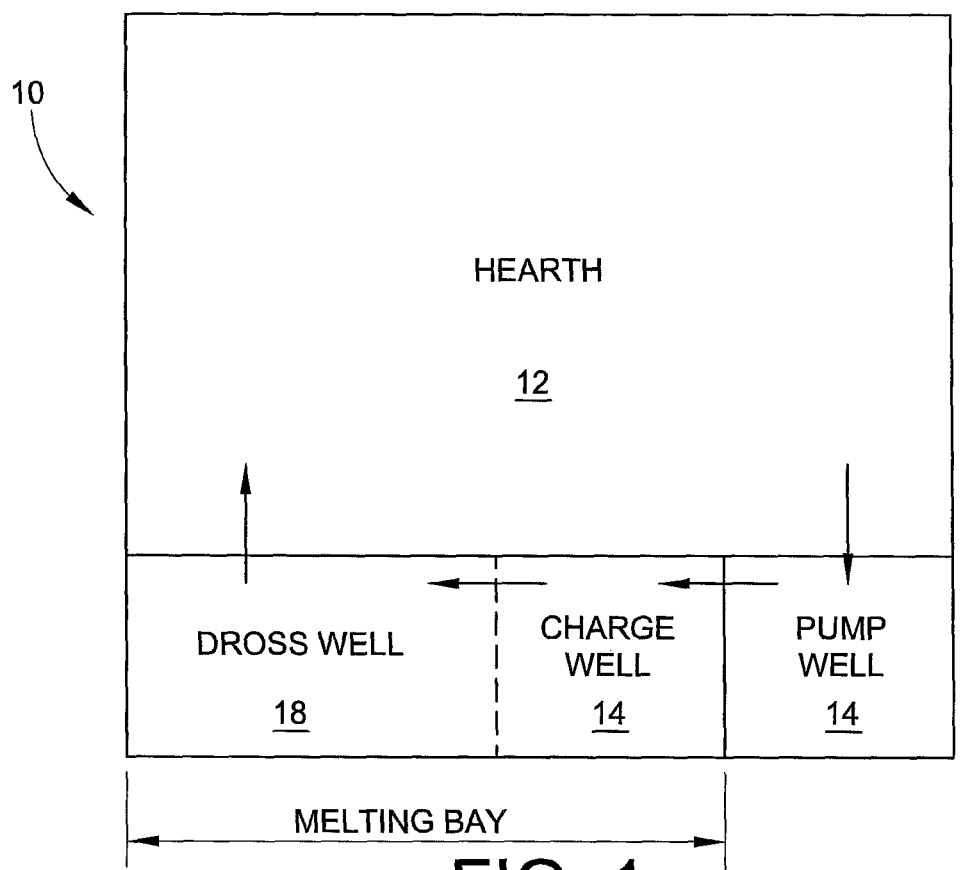
FIG. 1 is a schematic representation of a molten metal recycling furnace.

Referring now to FIG. 1, an aluminum recycling furnace 10 is depicted. Furnace 10 includes a main hearth component 12 which is heated, for example, with gas or oil burners or by any other means known in the art. Adjacent, and in fluid communication with the hearth 12 (typically via submerged archways), is the primary recycling area comprised of a pump well 14, a charge well 16 and a dross well 18. Although not shown, the wall of hearth 12 opens to the pump well 14, the pump well opens to the charge well 16, the charge well opens to the dross well 18, and the dross well opens to the hearth 12 to allow the circulation pattern shown by the arrows. The pump well can include a mechanical molten metal pump of any type known to those skilled in the art. Alternatively, the well and pump can be replaced by an electromagnetic pump, for example. The molten metal pump circulates molten metal from the hearth 12 to the charge well 16 where scrap chips of the metal to be recycled are deposited onto the surface of the melt. The charge well is also a location where additional metal or fluxes can be added to achieve a desired alloy. Molten metal from the charge well 16 flows into the dross well 18 wherein impurities in the form of dross are skimmed from the surface before the melt flows back into the hearth 12. This particular disclosure is directed to an improved design of the charge well 16.

Figure 2:
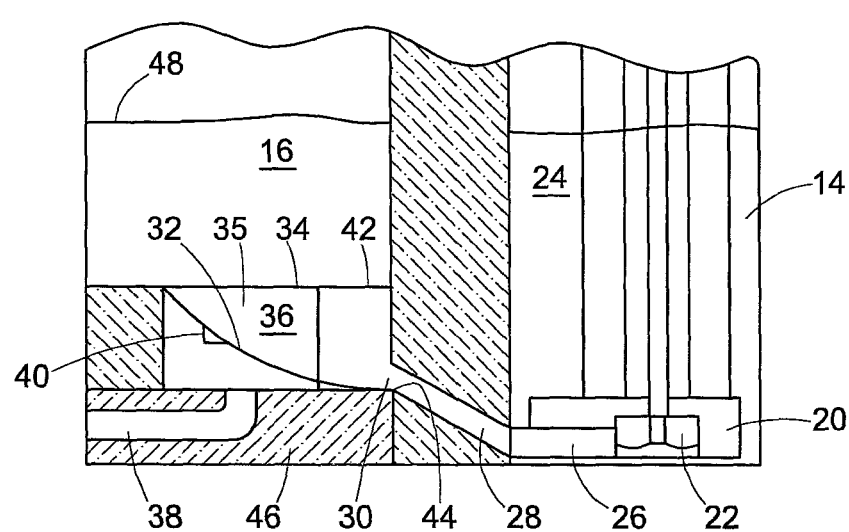
FIG. 2 is a cross-sectional view of a prior art pump well and charge well.
Figure 3:
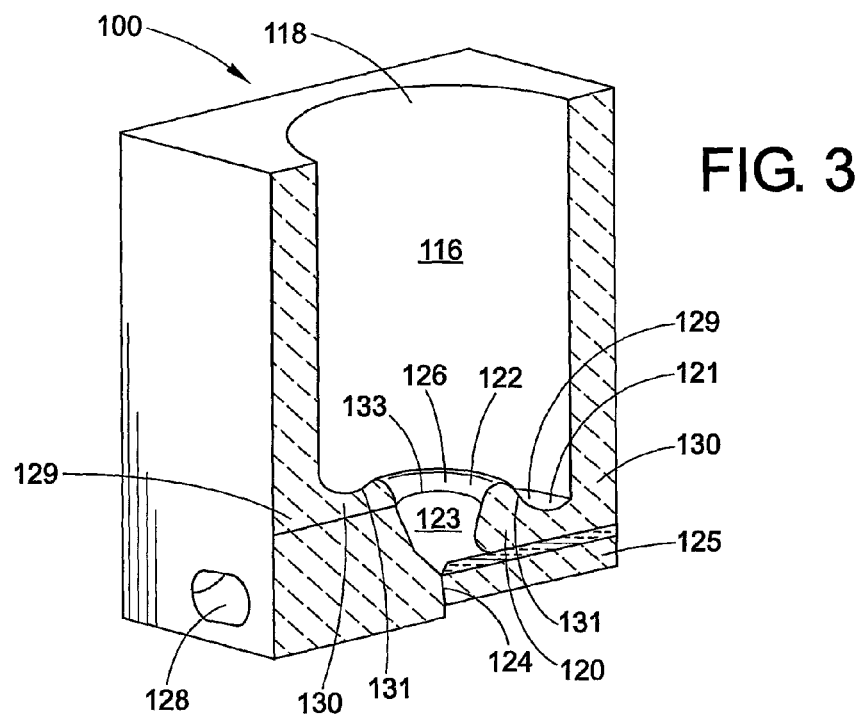
FIG. 3 is a perspective vertical cross-section view of the charge well of the present disclosure.

Referring now to FIG. 2, the pump well 14 and charge well 16 of FIG. 1 is displayed. Pump 20 is positioned in pump well 14 and draws molten aluminum from the hearth forcing it into the charge well 16. More particularly, the rotation of impeller 22 draws molten aluminum from the bath 24, into the pump 20 and forces it through outlet 26, up passage 28, and through inlet 30 into the charge well 16. Molten aluminum flows up the ramp 32 within charge well 16, spilling over an inner edge 34 of inner column 35 into cavity 36, and exits through outlet 38. The leading edge 44 of the ramp 32 can be positioned adjacent the inlet 30.

Because the present invention is applicable as a component for remodeling existing charge wells, it can be noted from FIG. 2 that the design includes a base section 46 of refractory material which elevates the cavity 36 to provide clearance for an outlet 38 and allows molten metal to flow into the dross well 18 of FIG. 1. As is recognized by those of ordinary skill in the art, metal chips being recycled are deposited onto the surface of the melt 48 in charge well 16.

Although the above description has been directed to a prior art device, it is noted that several features therein are equally applicable to the present disclosure and will be therefore be equally pertinent to the following discussion. Accordingly, the above description is also incorporated into the description of the present embodiment.

To increase furnace turnover, the molten metal pump component (in FIG. 2) can be run at higher RPM. Similarly, a larger molten metal pump that provides a greater flow can be employed. However, it has been found that the charge well (16 in FIG. 2) does not take full advantage of such an increased molten metal flow because the vortex formed therein may restrict flow. Moreover, it has been found that simply increasing the flow of molten metal output by the pump into the charge well may not improve scrap submergence because it may change the optimal shape of the vortex formed therein. Furthermore, because of the space constraints in typical furnace structures, the ability to increase the charge well dimension to install a larger submergence bowl to take advantage of higher pump throughput is not always a viable option. Accordingly, the present disclosure is directed to a unique charge well configuration that facilitates a relatively higher molten metal pump RPM to be run without formation of a degraded vortex. Furthermore, the unique charge well configuration has been found to provide impact and thermal resistance that is improved over prior designs.

The charge well of the present disclosure can comprise an open top chamber including walls constructed of a heat resistant material. Graphite and ceramic are good examples of suitable heat resistant materials. The chamber includes an inlet positioned in a side wall or base wall and in fluid communication with the pump well and an outlet in the base wall in fluid communication with the dross wall. Typically, the chamber will include an inner column defining the outlet in the chamber base wall, leading to an elbow and an internal conduit forming a side exit. Generally, the internal form of the chamber can be described as a bottom or low side wall inlet and a bottom outlet with a ramp formed between an inner column and the side wall.

Referring now to a first embodiment of the invention, reference is made to FIGS. 3-6. In this embodiment, a scrap melting device 100 can be comprised of a block of refractory material 102 which is constructed of a size suited to provide a relatively close tolerance mating with the dimensions of an existing charge well (e.g. charge well 16 of FIG. 1). Preferably, the block 102 is constructed of a cured material such as an alumina-silica refractory or other castable refractory material known to those skilled in the art. The surfaces of the cast body can be treated with boron nitride prior to heat treatment.

Block 102 includes a chamber 116 having generally cylindrical side wall 118, a base 120 including ramp 121, and an inner column 122 forming a centrally located cavity 123 leading to outlet 124 and outlet duct 125. Inner column 122 can have an end wall 126 opposite the base 120. The end wall 126 depicted herein has a constant height protruding above the base 120. However, it is also envisioned that end wall 126 of inner column 122 will spiral upwardly with the ramp such that the height of each is relatively consistent. Ramp 121 begins with a leading edge 127 adjacent the inlet 128 to the chamber 116.

Ramp 121 includes a first edge 129 engaging the side wall 118 and a second edge 131 engaging the inner column 122. A concave work surface 130 has been found to improve the function of the device. The concave work surface 130 is formed between the edges 129 and 131. The concave work surface does not necessarily extend over the full extent of the ramp. Rather, the concavity can be discontinuous. More particularly, it is envisioned that the concavity may extend over only the first 0 to 180°, the first 0 to 270°, the final 270° to 360° or the final 90 to 360° of the ramp spiral. The non-cave portions may be flat or even convex.

According to a further embodiment of the disclosure, the inner column 122 can have an end wall 126 including one of or both a rounded inside edge 133 and a rounded outside edge 135. Advantageously, the rounded edges 133/135 of the end wall have been found to provide a more robust device. Moreover, the rounded edges provide both a surface and a corresponding molten metal flow profile within chamber 116 that minimizes the likelihood of direct impact with large scrap pieces that otherwise crack and or chip the surface of the inner column. Similarly, inclusion of rounded edges 133/135 have been found to make the device more thermally robust. Particularly, sharp edges of refractory materials have been found to be more susceptible to thermal strain. Accordingly, the rounded edges 133/135 provide a block 102 more cable of resisting cracking when exposed to molten metal.

While ramp 121 is sloped, this does not need to be achieved by a constant incline. Rather, ramp 121 can be sloped over a first 180° portion, and remain horizontal over the final about 120° portion. Similarly, the invention is intended to encompass a ramp covering from as little as 45° of the circumference of the charge well to 360°. However, a ramp extending between 180° and 270° is typical.

Advantageously, the concave ramp and rounded end wall of the column form an hydrofoil shape. It has been found that the hydrofoil configuration allows the formation of a desirable vortex that resists the ingestion of air, even at relatively higher pump RPM. Moreover, the vortex is advantageously closed before it reached the elbow portion of the outlet. It may be beneficial that at least a substantially continuous curved surface exists. More particularly, it may be desirable that the cross-sectional surface extending from the edge of the ramp adjacent the side wall to the inner edge of the inner column is a surface having no vertices. As used herein, the lack of vertices is intended to mean that the surface in cross-section has no point where two flat portions intersect. Generally speaking, the shape of the ramp and top wall of the column can have an inverse "S" shape.

The present design has been found to provide at least three significant benefits. Particularly, (i) the rounded surfaces of the ramp and inner column have been found to be less susceptible to breakage from impact with solids entrained in the molten metal, (ii) the two rounded surfaces of the ramp and inner column have been found to be less susceptible to thermal strain and (iii) the flow rate achieved by the hydrofoil designs of the ramp and inner column are higher than prior designs at particular pump RPMs.

The following examples are provided to facilitate the explanation of the invention but are not intended to limit the invention to the specific embodiments disclosed therein.

EXAMPLES

Water Modeling

Figure 8:
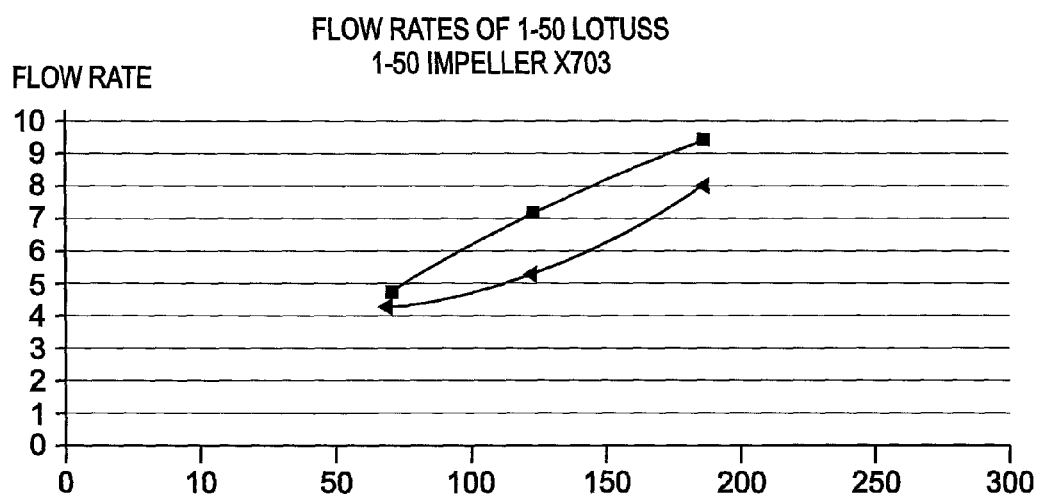
FIG. 8 is a graphical depicture of the test results from the examples of the present disclosure.
Figure 5:
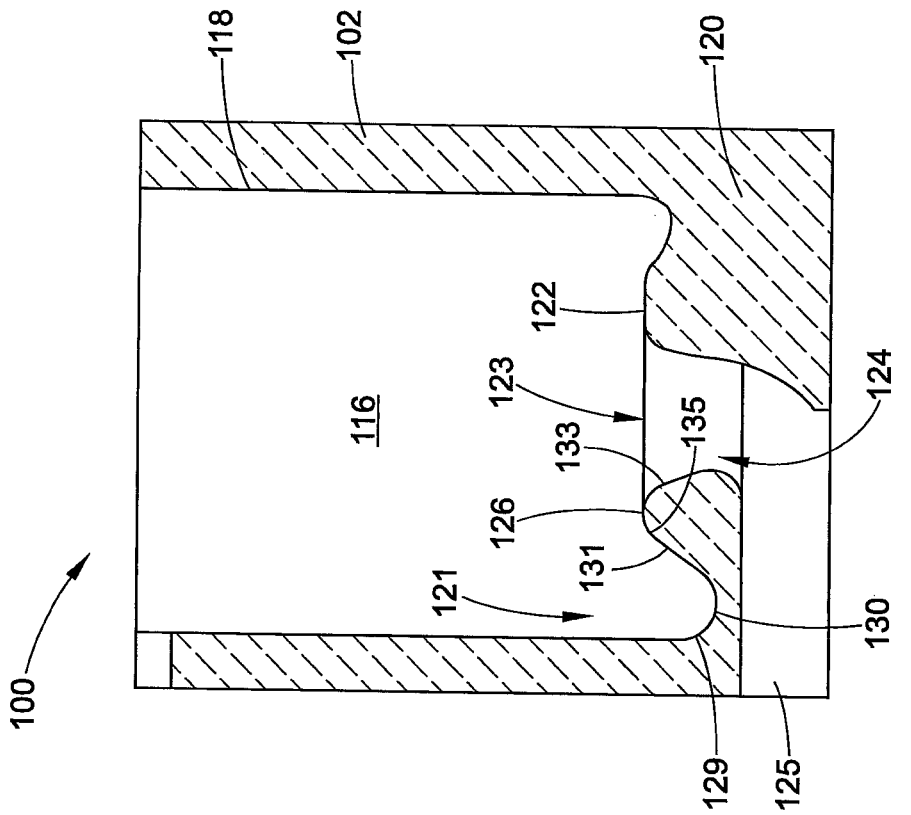
FIG. 5 is a right side cross-sectional view, partially in phantom, of the charge well of FIG. 3.
Figure 4:
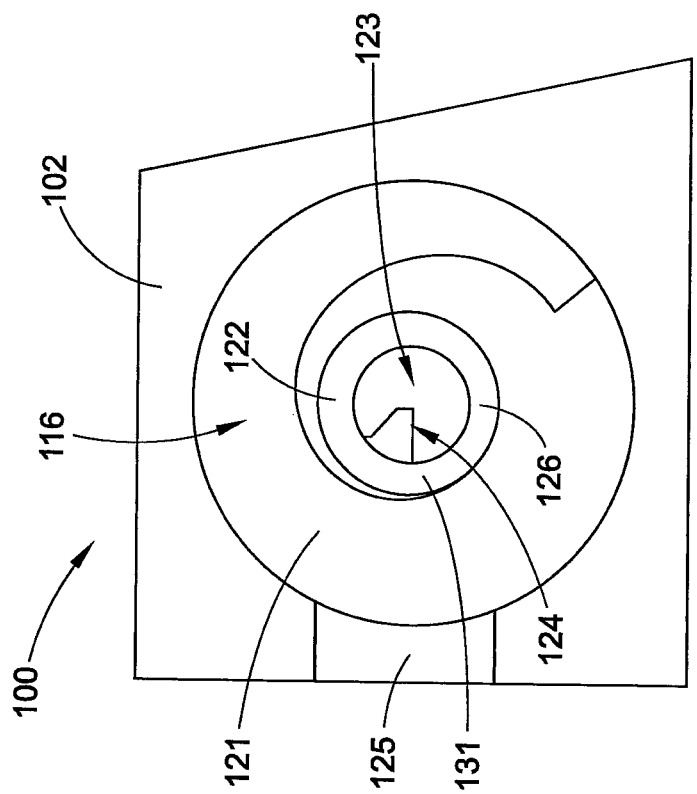
FIG. 4 is a top plan view of the charge well of FIG. 3.
Figure 7:
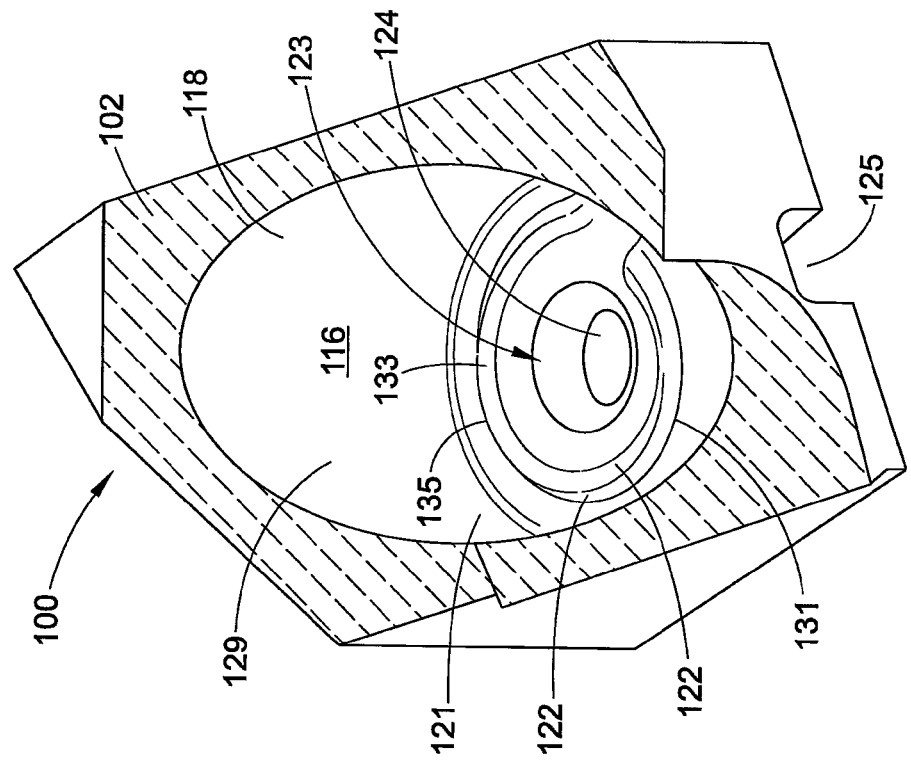
FIG. 7 is a perspective horizontal cross-section view, partially in phantom of the charge well of FIG. 3.
Figure 6:
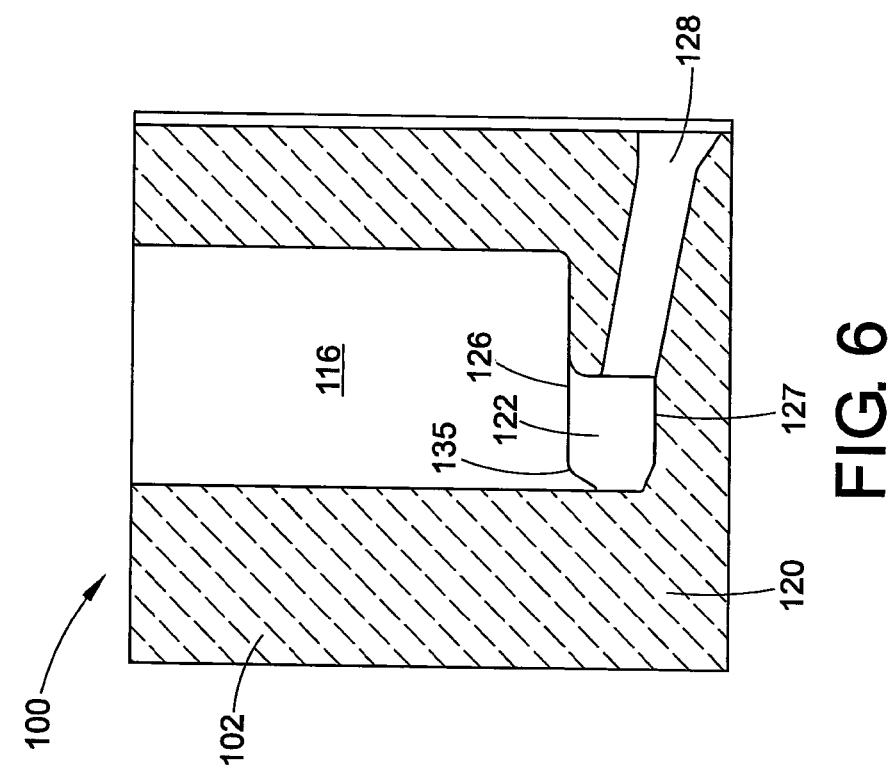
FIG. 6 is a left side cross-sectional view, partially in phantom of the charge well of FIG. 3.

Water modeling tests of the present system were conducted to evaluate performance. Specifically, a submergence well of the type depicted in FIG. 2 ("Classic") was compared to the design of FIGS. 3-7 ("Resistant"). The results demonstrate a more effective vortex is created in the resistant design at equivalent pump speeds. A visual descriptions of the flow rates achieved by the resistant versus classic submergence well designs is in FIG. 8.

Resistant LOTUSS
J-50 Pump with 48" Bowl ID
  23.5" Bath Depth

| Power % | Head (mm)* | J-50 RPM | J-50 Pressure (*WG) | J-50 Flow (gpm) | Metric tons/min |
|---|---|---|---|---|---|
| 20 | 3.00 | 76 | 3.5 | | |
| 40 | 5.50 | 121 | 5.0 | 510.8 | 4.64 |
| 60 | 9.75 | 173 | 8.5 | 796.7 | 7.24 |
| 80 | 19.00 | 237 | 18.5 | 1033.8 | 9.40 |
| 100 | 35.00 | 311 | 33.5 | | |

27.6" Bath Depth

| Power % | Head (mm)* | J-50 RPM | J-50 Pressure (*WG) | J-50 Flow (gpm) | Metric tons/min |
|---|---|---|---|---|---|
| 20 | 2.50 | 76 | 1.00 | | |
| 40 | 5.00 | 121 | 4.00 | 532.7 | 4.84 |
| 60 | 10.50 | 173 | 8.75 | 791.7 | 7.20 |
| 80 | 19.75 | 237 | 18.25 | 1037.9 | 9.44 |
| 100 | overflow | 311 | 23.00 | | |

33.5" Bath Depth

| Power % | Head (mm)* | J-50 RPM | J-50 Pressure (*WG) | J-50 Flow (gpm) | Metric tons/min |
|---|---|---|---|---|---|
| 20 | 2.0 | 76 | 1.00 | | |
| 40 | 5.5 | 121 | 4.00 | 532.7 | 4.84 |
| 60 | 10.5 | 173 | 8.75 | 791.7 | 7.20 |
| 80 | 20.5 | 237 | 18.25 | 1037.9 | 9.44 |
| 100 | overflow | 311 | 23.00 | | |

Classic LOTUSS
J-50 Pump with 48" Bowl ID
  23.5" Bath Depth

| Power % | Head (mm)* | J-50 RPM | J-50 Pressure (*WG) | J-50 Flow (gpm) | Metric tons/min |
|---|---|---|---|---|---|
| 20 | 38 | 76 | 3.50 | | |
| 40 | 139 | 121 | 8.00 | 430.5 | 3.91 |
| 60 | 279 | 173 | 13.875 | 665.8 | 6.05 |
| 80 | 560 | 237 | 20.75 | 995.5 | 9.05 |
| 100 | too much air | 311 | | | |

27.6" Bath Depth

| Power % | Head (mm)* | J-50 RPM | J-50 Pressure (*WG) | J-50 Flow (gpm) | Metric tons/min |
|---|---|---|---|---|---|
| 20 | 32 | 76 | 2.50 | | |
| 40 | 127 | 121 | 6.25 | 480.0 | 4.36 |
| 60 | 279 | 173 | 16.25 | 584.3 | 5.31 |

-continued

| Power % | Head (mm)* | J-50 RPM | J-50 Pressure (*WG) | J-50 Flow (gpm) | Metric tons/min |
|---|---|---|---|---|---|
| 80 | 508 | 237 | 26.50 | 884.3 | 8.04 |
| 100 | air | 311 | | | |

33.5" Bath Depth

| Power % | Head (mm)* | J-50 RPM | J-50 Pressure (*WG) | J-50 Flow (gpm) | Metric tons/min |
|---|---|---|---|---|---|
| 20 | 31 | 76 | 4.0 | | |
| 40 | 114 | 121 | 7.5 | 445.4 | 4.05 |
| 60 | 273 | 173 | 13.5 | 673.3 | 6.12 |
| 80 | 457 | 237 | 26.5 | 884.3 | 8.04 |
| 100 | overflow | 311 | | | |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A metal scrap submergence device comprising an open top chamber including side and base walls of a heat resistant material, an inlet in a side or base wall of the chamber for receiving molten metal, an outlet in the base of said chamber, and a ramp adjacent said side wall of the chamber, said ramp having a length and a width, the width of said ramp being defined by a first edge adjacent the side wall and second interior edge, and wherein the surface of said ramp between said first edge and said second edge is a concave surface in the direction of said width of the ramp.

2. The scrap submergence device of claim 1 being comprised of a boron nitride treated graphite or cast ceramic.

3. The scrap submergence device of claim 1, wherein said concave surface is discontinuous, being interrupted by portions of flat or convex ramp surface.

4. The scrap submergence device of claim 1, wherein said concave surface extends over one of about 0 to 180 degrees, about 0 to 270 degrees, about 270 to 360 degrees, and about 90 to 360 degrees of the ramp surface.

5. The scrap submergence device of claim 1, wherein an inner column defines a central cavity within the chamber and wherein said second interior edge of said ramp intersects said inner column.

6. The scrap submergence device of claim 5, wherein said inner column includes an end wall remote from said base of the chamber and wherein said end wall includes at least one rounded edge.

7. The scrap submergence device of claim 6, wherein said end wall includes at least two rounded edges.

8. The scrap submergence device of claim 7, wherein said at least two rounded edges of said end wall are adjacent to a convex portion of said ramp for at least a portion of the extent of the ramp remote from the base and wherein said portion provides an hydrofoil shaped surface extending from the first edge of the ramp to an interior edge of said inner column.

9. The scrap submergence device of claim 1, wherein said ramp extends between about 45 degrees and 360 degrees of the circumference of said chamber.

10. The scrap submergence device of claim 9, wherein said ramp includes both horizontal and sloped regions.

11. The scrap submergence device of claim 8, wherein said ramp is convex throughout its extent and wherein said end wall includes two rounded edges throughout its circumference such that the working surface remote from said base is substantially continuously curved.

12. The scrap submergence device of claim 11 wherein said working surface comprises a generally inverse S shape.

13. A scrap submergence device having an open top chamber including walls constructed of a heat resistant material, the chamber including an inlet positioned in a side wall or a base wall and an outlet positioned in the base wall, a ramp adjacent the side wall of the chamber and spiraling upwardly thereon, the ramp extending from the side wall to an inner column defining the outlet, the inner column includes an end wall disposed opposite the chamber base, the end wall having at least two rounded edges.

14. A metal scrap submergence device comprising an open top chamber including side and base walls of a heat resistant material, an inlet in a side wall or a base wall of the chamber for receiving molten metal, an outlet in the base wall of said chamber, and a ramp extending from said side wall of the chamber to an inner column defining the outlet, said ramp includes a first edge adjacent the side wall and second edge adjacent the inner column, the working surface of said ramp between said first and second edges is concave in a direction of a width of the ramp, and wherein said inner column includes an end wall disposed opposite the chamber base, the end wall including rounded inner and outer edges.

15. The scrap submergence device of claim 14, wherein said chamber is substantially circular in cross-section.

16. The device of claim 14, wherein the surface of the device in cross section extending from the first edge of the ramp adjacent the side wall to the inner edge of the inner column is comprised of a working surface having no vertices.

17. A method for recycling of metal scrap comprising the use of the device of one of claim 1, said method comprising depositing metal pieces onto a molten metal bath in the open top chamber and pumping molten metal into said inlet and upwardly along the ramp to create a vortex in said bath which draws said metal pieces into said bath.

18. A method for recycling of metal scrap comprising the use of the device of claim 13, said method comprising depositing metal pieces onto a molten metal bath in the open top chamber and pumping molten metal into said inlet and upwardly along the ramp to create a vortex in said bath which draws said metal pieces into said bath.

19. A method for recycling of metal scrap comprising the use of the device of claim 14, said method comprising depositing metal pieces onto a molten metal bath in the open top chamber and pumping molten metal into said inlet and upwardly along the ramp to create a vortex in said bath which draws said metal pieces into said bath.

* * * * *